(12) United States Patent
Bhattacharya et al.

(10) Patent No.: US 11,334,798 B2
(45) Date of Patent: May 17, 2022

(54) CONFIGURABLE LAYERED NEURAL NETWORK ENGINE FOR CUSTOMER SUPPORT

(71) Applicant: DELL PRODUCTS L.P., Round Rock, TX (US)

(72) Inventors: Niladri Bhattacharya, Bengaluru (IN); Ravishankar Nanjundaswamy, Bangalore (IN)

(73) Assignee: DELL PRODUCTS L.P., Round Rock, TX (US)

(*) Notice: Subject to any disclaimer, the term of this patent is extended or adjusted under 35 U.S.C. 154(b) by 926 days.

(21) Appl. No.: 16/050,498

(22) Filed: Jul. 31, 2018

(65) Prior Publication Data

US 2020/0042880 A1 Feb. 6, 2020

(51) Int. Cl.
| | | |
|---|---|---|
| *G06Q 30/06* | (2012.01) |
| *G06N 3/08* | (2006.01) |
| *G06Q 10/06* | (2012.01) |
| *H04W 24/10* | (2009.01) |
| *G06N 3/10* | (2006.01) |
| *G06N 3/04* | (2006.01) |
| *G06N 5/04* | (2006.01) |
| *G06F 17/16* | (2006.01) |
| *G06Q 30/00* | (2012.01) |
| *G06F 16/903* | (2019.01) |

(52) U.S. Cl.
CPC .............. *G06N 3/10* (2013.01); *G06F 16/903* (2019.01); *G06F 17/16* (2013.01); *G06N 3/04* (2013.01); *G06N 5/04* (2013.01); *G06Q 30/016* (2013.01)

(58) Field of Classification Search
CPC .. G06N 3/10; G06N 3/04; G06N 5/04; G06N 5/022; G06N 3/0427; G06N 3/0445; G06N 3/08; G06N 5/041; G06F 16/903; G06F 17/16; G06Q 30/01
USPC ....................................................... 706/1–62
See application file for complete search history.

(56) References Cited

U.S. PATENT DOCUMENTS

| | | |
|---|---|---|
| 6,208,720 B1 | 3/2001 | Curtis et al. |
| 6,560,592 B1 | 5/2003 | Reid et al. |
| 7,027,463 B2 | 4/2006 | Mathew et al. |
| 7,292,723 B2 | 11/2007 | Tedesco et al. |
| 7,433,855 B2 | 10/2008 | Gavan et al. |
| 8,676,721 B2 | 3/2014 | Piovesan et al. |
| 9,246,759 B2 | 1/2016 | Gurajala et al. |
| 10,062,245 B2 | 8/2018 | Fulker et al. |

(Continued)

FOREIGN PATENT DOCUMENTS

CA 2505909 C 2/2015

*Primary Examiner* — Brandon S Cole
(74) *Attorney, Agent, or Firm* — Jackson Walker LLP; Christopher J. Rourk (57) ABSTRACT

A system comprising a dynamically configurable neural network engine operating on a plurality of processors, an automated knowledge matrix creation system operating on a processor and coupled to the dynamically configurable neural network engine, the automated knowledge matrix creation system configured to provide an input to the neural network engine, and a machine comprehension system coupled to the dynamically configurable neural network engine and configured to associate a plurality of product development documents with a customer created knowledge base and to provide input to the neural network engine.

16 Claims, 3 Drawing Sheets

(56) References Cited

U.S. PATENT DOCUMENTS

| | | | |
|---|---|---|---|
| 10,156,959 B2 | 12/2018 | Fulker et al. | |
| 10,499,081 B1* | 12/2019 | Wang | H04L 65/607 |
| 2005/0071266 A1* | 3/2005 | Eder | G06Q 40/00 |
| | | | 705/38 |
| 2008/0177716 A1* | 7/2008 | Hejlsberg | G06F 16/24547 |
| 2014/0279196 A1* | 9/2014 | Wilson | G06Q 30/0631 |
| | | | 705/26.7 |
| 2018/0293497 A1* | 10/2018 | Ravindran | G06N 3/0445 |
| 2019/0122102 A1* | 4/2019 | Leobandung | G06N 3/0454 |
| 2019/0138599 A1* | 5/2019 | Sen | G06F 40/253 |
| 2020/0413316 A1* | 12/2020 | Isaksson | H04W 24/10 |

* cited by examiner

CONFIGURABLE LAYERED NEURAL NETWORK ENGINE FOR CUSTOMER SUPPORT

TECHNICAL FIELD

The present disclosure relates generally to user interface systems, and more specifically to a configurable layered neural network engine for customer support that can use a knowledge matrix generated from customer support documents and sessions.

BACKGROUND OF THE INVENTION

Neural networks can be used to provide specialized functions, such as responses to structured queries that have been used to configure the neural network, but a generalized neural network for providing responses to unstructured user-generated queries is now known.

SUMMARY OF THE INVENTION

A system comprising a dynamically configurable neural network engine operating on a plurality of processors, an automated knowledge matrix creation system operating on a processor and coupled to the dynamically configurable neural network engine, the automated knowledge matrix creation system configured to provide an input to the neural network engine, and a machine comprehension system coupled to the dynamically configurable neural network engine and configured to associate a plurality of product development documents with a customer created knowledge base and to provide input to the neural network engine.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

Manufacturer product support typically requires a human resource element, which has associated fixed and variable costs. Customer queries are mostly repetitive and may reflect a lack of understanding of the product. Even though existing customer support materials can be responsive, there is a repeated need of considerable amount of time and monetary investment from manufacturer product support, as well as from customers, to respond to such queries.

The present disclosure leverages an existing manufacturer customer support knowledge-base and an existing product knowledge-base to find the most appropriate "knowledge layer" that can be used to generate the most-likely solution, in a customer understandable form. First, training data for the disclosed system and method can be prepared from a manufacturer's customer support database that contains conversation records of a customer and a support assistant. Such conversations are typically recorded, but individual review of these recorded conversations is time consuming and is typically not performed. The flow of the questions and answers in those conversation records can thus be taken into consideration, and the data can be labeled accordingly (i.e. "question" and "answer"). In addition, there may also be a flow of questions and additional questions, such as to reflect the path that the user takes to get to the final answer that they are looking for.

A machine comprehension (MC) neural network can be trained on the hierarchical structure of knowledge base of the product. For example, training can be performed starting from customer facing documents like user guides, product specifications to low level design documents and the manufacturer's customer support database, to act as the context for the queries sent by the customer. Customer-vendor interactions and the associated question and answer transcripts can also provide a knowledge base that can be used to train the MC neural network, where the sequence of questions and answers and the ultimate guidance provided to each customer can be used to identify trends, associations and other data relationships. In one example embodiment, the transcripts of customer-vendor interactions between customers with problems and knowledgeable vendor personnel can provide keyword relationships that can be used to help identify associated solutions to problems in less time, as well as to help with formulation of machine responses to customer queries that are based on previous human responses. In addition, a long short term memory (LSTM) neural network can be used, which is a neural network that include a memory at each of a plurality of nodes, and which can functionally receive a remember command (such as by receiving and storing a data set) and a forget command (such as by purging the stored data set), which allows the memory to be emptied after a suitable event, such as a change in a query.

A "knowledge-matrix" can be formulated from the customer facing documents, as well as implementation detail documents, such as product design specifications, the output of a run-time tool that depicts the code-flow of a product, as well as the customer support database. This knowledge-matrix will have N-layers, configured according to the product, customer-vendor interactions and so forth. The knowledge-matrix thus spans from a "system-level use-case" to the specific "function-level use-case." Each layer of the matrix has a set of key words that can be derived from the feature names in implementation detail documents, and also from identifiers that are used in the code-base of the product.

In one example embodiment, the present disclosure includes an engine that has six layers that range from the function use-case level to an output layer, and which generates a span from the context based on a query that is sent to it. Based on the query, a level can be chosen, and a subsequent level can be chosen based on the initial query or based on a response to a subsequent query that is generated for the user.

The present disclosure provides a neural engine architecture that uses the system level use-case and the function level use-case with the MC layer trained on product documents and tools and the manufacturers customer support data-base. The function level use-case and the system level use-case, along with the manufacturer customer support data-base, can be processed by the MC layer. The MC layer can identify the context of a query that is sent by the customer, and can generate one or more probable context spans that are responsive to the query.

The context spans that are obtained as the output of the MC layer can be mined for keywords. These keywords enable mapping to the corresponding product knowledge-matrix, to identify the level at which the queries are present. The queries can then be addressed with the most appropriate solution, or a further clarification can be requested from the user (in accordance with the knowledge-matrix), to determine the root-cause of the problem and to provide the most suitable solution.

The present disclosure provides a number of technical features and advantages. One technical feature is a dynamically configurable neural network engine for an enterprise server-based customer support system that helps to reduce the need for human interaction while overcoming the drawbacks of query-based automated customer service based solutions. Another technical feature is automated creation of a knowledge-matrix, which is used for the configurable neural network engine. Another technical feature is an MC association of product development documents with a customer-created knowledge base, to derive patterns of queries from customers and to improve the responsiveness of the automated procedures.

The present disclosure also provides a customer benefit in terms of problem/issue resolution time, as each customer will get a dedicated virtual support resource. This also results in a savings on investment for customer support and easy integration of subsequent new product support.

Figure 1:
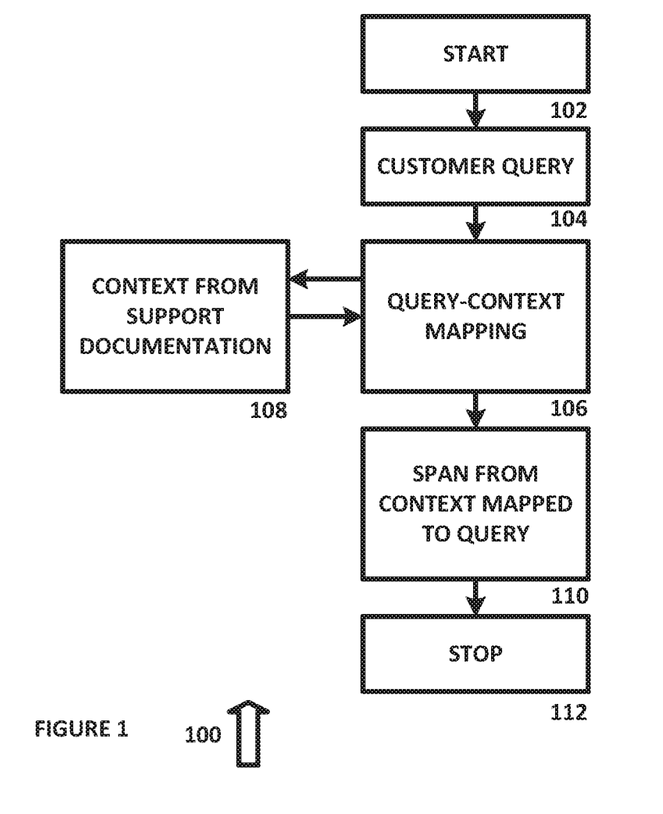
FIG. 1 is a diagram of an algorithm for a configurable, layered neural network engine for customer support, in accordance with an example embodiment of the present disclosure.

FIG. 1 is a diagram of an algorithm 100 for a configurable, layered neural network engine for customer support, in accordance with an example embodiment of the present disclosure. Algorithm 100 can be implemented in hardware or a suitable combination of hardware and software.

Algorithm 100 begins at 102, where a customer query engine is started, such as by selecting a customer query control. The algorithm then proceeds to 104, where the customer query is entered, such as by receiving entered text, converted speech to text, or in other suitable manners. In addition, one or more keywords can be extracted from the test, or other suitable processes can also or alternatively be used. The algorithm then proceeds to 106.

In addition, context from support documentation is generated at 108. In one example embodiment, the support documentation is processed to identify key words or other suitable data, such as by using the processes discussed in "Machine comprehension using match-LSTM and answer pointer," Wang S, Jiang J. (2017), "Machine comprehension using match-LSTM and answer pointer," International Conference on Learning Representations, Toulon, France, April 24-26: Proceedings, at FIG. 1 and Section II, "Method," pp. 3-6, which is hereby incorporated by reference for all purposes, as if set forth herein in its entirety. The pre-query context can also be clarified if needed, such as when a customer query does not include a sufficient number of key words or for other suitable reasons.

At 106, query-context mapping is performed, such as by using a neural network that has been trained as disclosed herein. The query-context mapping can be an iterative process, as discussed further herein, where one or more additional queries are used to navigate the user through a knowledge matrix, or other suitable processes can also or alternatively be used. The algorithm then proceeds to 110, where the span from the context mapped to the query is further processed, such as shown at 410 in FIG. 4 or in other suitable manners. In one example embodiment, the span can include only those sections of a document that include content that is relevant and responsive to the query, such as one or more paragraphs, pages, sections and the like. The algorithm then proceeds to 112 and terminates.

Although algorithm 100 is shown as a flow chart, one or more flow charts, one or more objects or agents, one or more state machines, one or more threads or other suitable programming paradigms can also or alternatively be used to implement algorithm 100.

Figure 2:
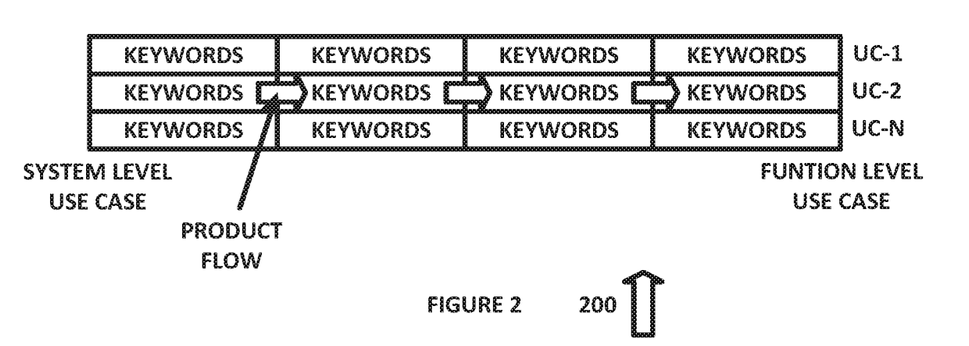
FIG. 2 is a diagram of a knowledge matrix, in accordance with an example embodiment of the present disclosure.

FIG. 2 is a diagram of a knowledge matrix 200, in accordance with an example embodiment of the present disclosure. Knowledge matrix 200 has N layers, and is configured according to a product. The matrix spans the system level use case to the specific function level use case, where each layer of the matrix has a set of key words that are derived from the feature names.

In one example embodiment, the product flow from the system level use case to the function level use case can be created from a technical knowledge base that is derived from user manuals, the source code, design documents, transcripts of technical assistance calls and other sources, such as where the actual source document is not going to be provided to a customer in response to the query, but where it nonetheless provides useful content for responding to customer queries. In particular, the keyword flow can include a series of keywords that are related to questions that may either be asked by a customer or response to questions that might be answered by a customer, so as to help navigate from the system level use case to the function level use case.

Figure 3:
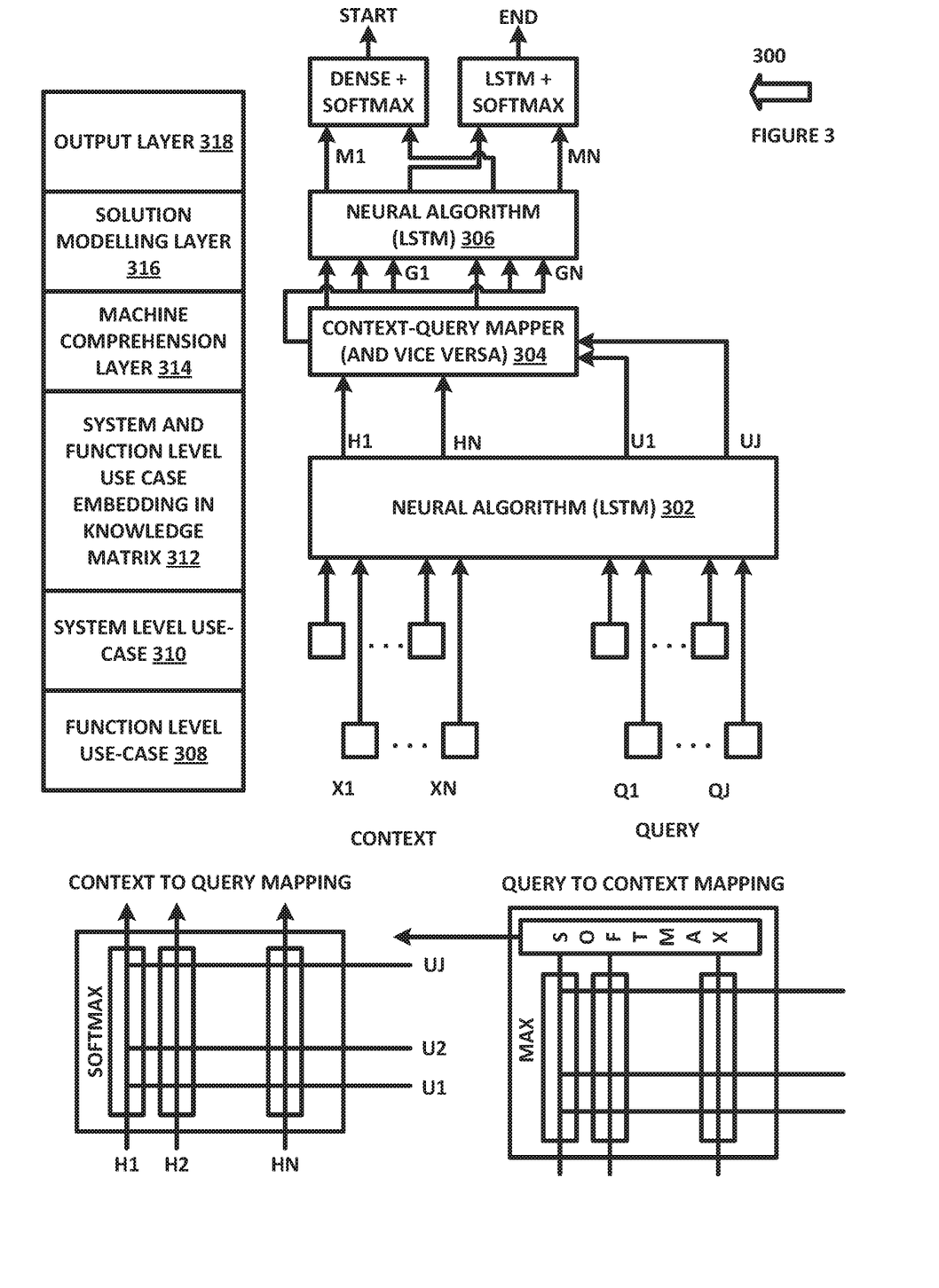
FIG. 3 is a diagram of a neural engine architecture, in accordance with an example embodiment of the present disclosure.

FIG. 3 is a diagram of a neural engine architecture 300, in accordance with an example embodiment of the present disclosure. Neural engine architecture 300 includes neural algorithm 302, context-query mapper 304, neural algorithm 306, span start and span end, function level use case 308, system level use case 310, system and function level use case embedding in knowledge matrix 312, machine comprehension layer 314, solution modelling layer 316 and output layer 318, each of which can be implemented in hardware or a suitable combination of hardware and software.

Neural algorithm 302 can be implemented as an LSTM neural network or other suitable neural networks, and can be configured to use a plurality of long short-term memory units in a recurrent neural network. In one example embodiment, context and query inputs from system 100 can be used to generate the context and query inputs, which are then provided to neural algorithm 302. A plurality of function level use case 308 and system level use case 310 context inputs X1 through XN are provided, as well as a plurality of function level use case 308 and system level use case 310 query inputs Q1 through QJ. Based on the mapping of the inputs and a current knowledge-matrix, a plurality of outputs are generated that can include rankings associated with the inputs. The outputs of neural algorithm 302 include H1 through HN and U1 through UN.

In one example embodiment, the context and query inputs to neural algorithm 302 can be related to the technical knowledge base that is used to create neural algorithm 302, which context inputs X1 through XN and query inputs Q1 through QJ, and which generates ranked outputs H1 through HN and U1 through UJ, respectively. The ranking can be generated as a function of the knowledge base, such as to determine the knowledge matrix layer that is best associated with a query and to generate output rankings for use by context-query mapper 304.

Context-query mapper 304 receives ranked inputs H1 through HN and U1 through UN and is configured to generate outputs G1 through GN. In one example embodiment, context-query mapper 304 can use knowledge matrix 200 or other suitable context to query mapping or query to context mapping that uses keywords in a structured matrix to progress from a system level use case to a function level use case.

Neural algorithm 306 can be implemented as an LSTM neural network or in other suitable manners, and is configured to receive inputs G1 through GN and generates outputs M1 through MN. In one example embodiment, neural algorithm 306 can apply an LSTM network that generates a ranked span output that can be used to generate a response to a user query.

Span start and span end receive inputs M1 through MN, and generate a dense and softmax start span output and an LSTM and softmax end span output. In one example embodiment, dense and softmax start span output and an LSTM and softmax end span output can be ranked to create a text response in a format that can be understood by a user, such as from segments of text documents that correlate strongly to context X1 through XN and Query Q1 through QJ, outputs H1 through HN and U1 through UJ, outputs G1 through GN and output M1 through MN.

Function level use case 308 provides function level use case inputs to neural algorithm 302. In one example embodiment, function level use case 308 can include one or more layers of a knowledge matrix that is mapped from user support documents, customer support query-answer sessions, source code or other materials, and which includes key words mapped to associated state progressions.

System level use case 310 provides system level use case inputs to neural algorithm 302. In one example embodiment, system level use case 310 can include one or more layers of a knowledge matrix that is mapped from user support documents, customer support query-answer sessions, source code or other materials, and which includes key words mapped to associated state progressions.

System and function level use case embedding in knowledge matrix 312 is used to provide neural algorithm 302 functionality. In one example embodiment, system and function level use case embedding in knowledge matrix 312 can include one or more layers of a knowledge matrix that is mapped from user support documents, customer support query-answer sessions, source code or other materials, and which includes key words mapped to associated state progressions.

Machine comprehension layer 314 is used to provide context-query mapper 304 functionality. In one example embodiment, machine comprehension layer 314 can include one or more layers of a knowledge matrix that is mapped from user support documents, customer support query-answer sessions, source code or other materials, and which includes key words mapped to associated state progressions.

Solution modelling layer 316 is used to provide neural algorithm (LSTM) 306 functionality. In one example embodiment, solution modelling layer 316 can include one or more layers of a knowledge matrix that is mapped from user support documents, customer support query-answer sessions, source code or other materials, and which includes key words mapped to associated state progressions.

In one example embodiment, context to query mapping can be configured to use a softmax algorithm having inputs H1 to HN and U1 to UJ, where the associated output mapping is as shown. Likewise, query to context mapping can be configured to use softmax with inputs H1 to HN and U1 to UJ, where the associated output mapping is as shown.

Figure 4:
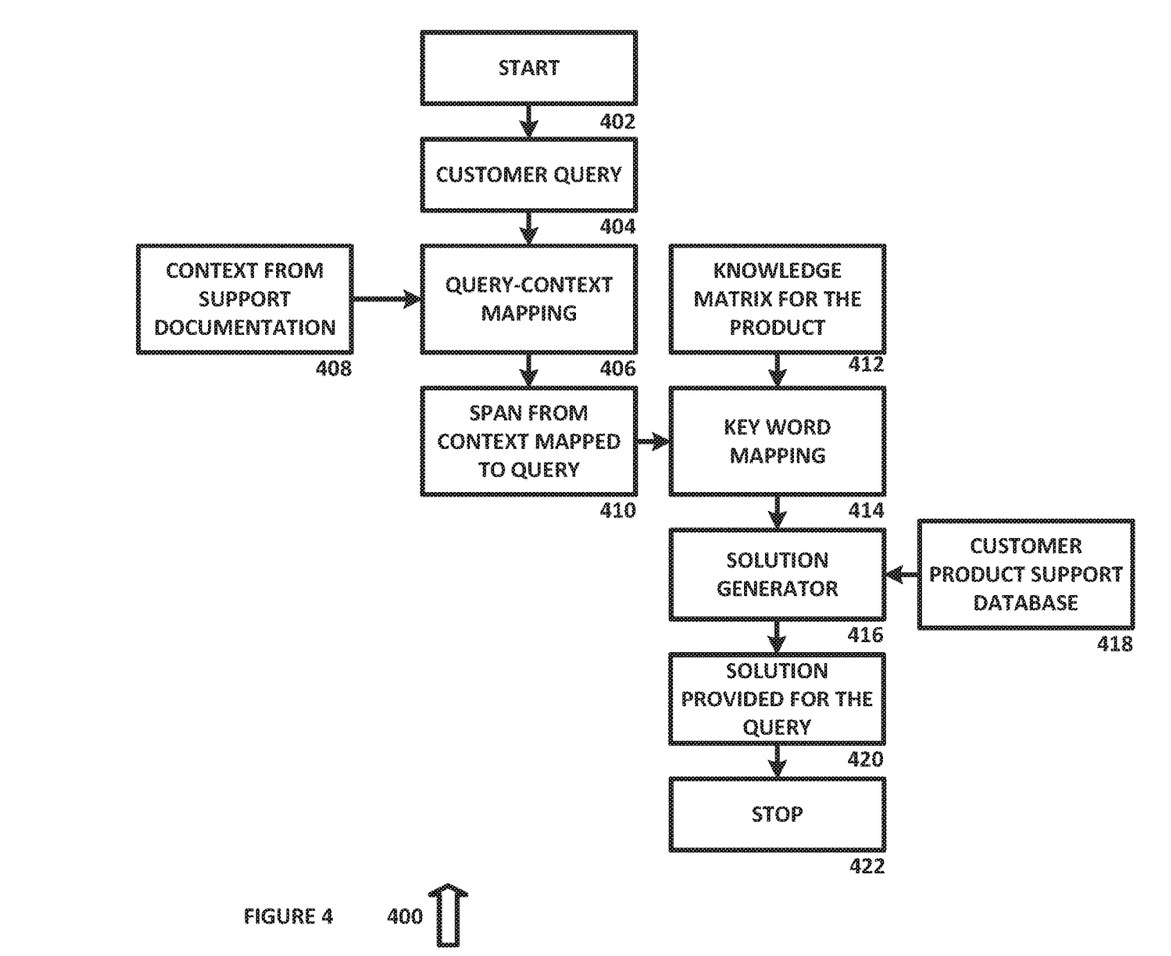
FIG. 4 is a diagram of an algorithm for a configurable, layered neural network engine for customer support, in accordance with an example embodiment of the present disclosure.

FIG. 4 is a diagram of an algorithm 400 for a configurable, layered neural network engine for customer support, in accordance with an example embodiment of the present disclosure. Algorithm 400 can be implemented in hardware or a suitable combination of hardware and software.

Algorithm 400 begins at 402, where a customer query engine is started, such as by selecting a customer query control. The algorithm then proceeds to 404, where the customer query is entered, such as by receiving entered text, converted speech to text, or in other suitable manners. One or more keywords can also be extracted, where the keywords can be associated with a matrix position in a knowledge-matrix or other suitable data structures. The algorithm then proceeds to 406.

In addition, context from support documentation is generated at 408. In one example embodiment, the support documentation is processed to identify key words or other suitable data, such as by using the processes discussed in "Machine comprehension using match-LSTM and answer pointer," Wang S, Jiang J. (2017), "Machine comprehension using match-LSTM and answer pointer," International Conference on Learning Representations, Toulon, France, April 24-26: Proceedings, at FIG. 1 and Section II, "Method," pp. 3-6, which is hereby incorporated by reference for all purposes, as if set forth herein in its entirety.

At 406, query-context mapping is performed, such as by using a neural network that has been trained as disclosed herein. In one example embodiment, an LSTM neural network or other suitable algorithms can be used. In another example embodiment, a forgot control can used to configure one or more nodes in conjunction with a knowledge matrix, or other suitable controls are provided. The algorithm then proceeds to 410, where the a text span from the query-context mapping is provided to key word mapping 414. In one example embodiment, the text span can include one or more sentences, paragraphs, sections or other portions of documents or materials that have a highest ranking output associated with an input.

At 414, a knowledge matrix for the product 412 provides input to key word mapping 414 with the span from the context mapped to the query. In one example embodiment, the knowledge matrix can include a plurality of levels, where each level is associated with a plurality of keywords, and where the transition between layers can be associated with predetermined keywords, a predetermined query structure, a predetermined sequence of queries and associated responses or other suitable data. The output of keyword mapping 414 is then provided to solution generator 416 with input from a customer product support database 418. In one example embodiment, solution generator 416 and customer product support database 418 can be associated with separate layers in the knowledge matrix or other suitable data structures that are used to configure a plurality on nodes of an LSTM neural network algorithm. The algorithm then proceeds to 420.

At 420, a solution is provided for the query. In one example embodiment, the solution can include text that is generated based on the output of solution generator 416, where the output is ranked and the highest ranked output is selected to be provided to the user. The algorithm then proceeds to 422 and terminates.

Although algorithm 400 is shown as a flow chart, one or more flow charts, one or more objects or agents, one or more state machines, one or more threads or other suitable programming paradigms can also or alternatively be used to implement algorithm 400.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for product support comprising:
a dynamically configurable neural network engine operating on a plurality of processors wherein the dynamically configurable neural network engine comprises a long short term memory neural network algorithm with a plurality of nodes, each node having an associated memory function and the automated knowledge matrix comprises sequential keyword mapping starting from a system level use case for a system having a plurality of functions and ending with a function level use case for a specific one of the functions of the plurality of functions;

an automated knowledge matrix creation system operating on a processor and coupled to the dynamically configurable neural network engine, the automated knowledge matrix creation system configured to provide an input to the neural network engine; and a machine comprehension system coupled to the dynamically configurable neural network engine and configured to associate a plurality of product development documents with a knowledge base of customer-vendor interactions and to provide input to the neural network engine.

2. The system of claim 1 wherein the dynamically configurable neural network engine comprises a long short term memory neural network algorithm and the automated knowledge matrix comprises separate sequential keyword mapping for at least two distinct functions.

3. The system of claim 1 wherein the dynamically configurable neural network engine comprises a long short term memory neural network algorithm with a plurality of nodes and the automated knowledge matrix comprises sequential keyword mapping starting from a system level use case for at least two distinct systems.

4. The system of claim 1 wherein the dynamically configurable neural network engine comprises a long short term memory neural network algorithm with a plurality of nodes, each node having an associated memory function configured to receive the input from the automated knowledge matrix creation system and the automated knowledge matrix comprises a plurality of sequential keyword mapping use cases starting from each of a plurality of system level use cases and ending with a plurality of function level use cases, each function level use case associated with at least one system level use case.

5. The system of claim 1 wherein the dynamically configurable neural network engine comprises a long short term memory neural network algorithm with a plurality of nodes, each node having an associated memory function configured to receive the input from the machine comprehension system and the automated knowledge matrix comprises sequential keyword mapping comprising at least two distinct and separate series of mapped keywords.

6. The system of claim 1 wherein the dynamically configurable neural network engine comprises a long short term memory neural network algorithm with a plurality of nodes, each node having an associated forget function configured to forget the input from the automated knowledge matrix creation system and the automated knowledge matrix comprises sequential keyword mapping comprising at least three distinct and non-equivalent series of mapped keywords.

7. The system of claim 1 wherein the dynamically configurable neural network engine comprises a long short term memory neural network algorithm with a plurality of nodes, each node having an associated forget function configured to forget the input from the machine comprehension system and the automated knowledge matrix comprises sequential keyword mapping comprising at least three series of mapped non-equivalent keywords driven by a product flow, starting with a system level use case and ending with a function level use case.

8. A method comprising:
starting a customer query engine and receiving an input from the customer query engine;
providing the input to a dynamically configurable neural network engine operating on a plurality of processors from an automated knowledge matrix creation system operating on a processor and coupled to the dynamically configurable neural network engine in response to the input, wherein the dynamically configurable neural network engine comprises a long short term memory neural network algorithm with a plurality of nodes, each node having an associated memory function and the automated knowledge matrix comprises sequential keyword mapping starting from a system having a plurality of functions and ending with a function level use case for a specific one of the functions of the plurality of functions;

associating a plurality of product development documents with a knowledge base generated from customer-vendor interactions using a machine comprehension system coupled to the dynamically configurable neural network engine and query-context mapping as a function of the input; and providing an input to the neural network engine from the machine comprehension system based on the plurality of product development documents.

9. The method of claim 8 wherein providing the input to the dynamically configurable neural network engine comprises providing a plurality of the inputs from a customer query engine to a long short term memory neural network algorithm.

10. The method of claim 8 wherein providing the input to the dynamically configurable neural network engine comprises providing the input and a function level use case input to a long short term memory neural network algorithm with a plurality of nodes.

11. The method of claim 8 wherein providing the input to the dynamically configurable neural network engine comprises providing the input, a function level use case input and a system-level use case input to a long short term memory neural network algorithm with a plurality of nodes, each node having an associated memory function.

12. The method of claim 8 wherein providing the input to the dynamically configurable neural network engine comprises providing the input and a system and function level use case embedding in knowledge matrix to a long short term memory neural network algorithm with a plurality of nodes, each node having an associated memory function configured to receive the input from the automated knowledge matrix creation system.

13. The method of claim 8 wherein providing the input to the dynamically configurable neural network engine comprises providing the input and a machine comprehension layer to a long short term memory neural network algorithm with a plurality of nodes, each node having an associated memory function configured to receive the input from the machine comprehension system.

14. The method of claim 8 wherein providing the input to the dynamically configurable neural network engine comprises providing the input and a solution modelling layer to a long short term memory neural network algorithm with a plurality of nodes, each node having an associated forget function configured to forget the input from the automated knowledge matrix creation system.

15. The method of claim 8 wherein providing the input to the dynamically configurable neural network engine comprises providing the input to a long short term memory neural network algorithm with a plurality of nodes, each node having an associated forget function configured to forget the input from the machine comprehension system.

16. A system for customer support comprising:
a dynamically configurable neural network engine operating on a plurality of processors;
an automated knowledge matrix creation system operating on a processor having a series of mapped keywords associated with each of a plurality of products and coupled to the dynamically configurable neural network engine, the automated knowledge matrix creation system configured to provide an input to the neural network engine, wherein the dynamically configurable neural network engine comprises a long short term memory neural network algorithm with a plurality of nodes, each node having an associated memory function and the automated knowledge matrix comprises sequential keyword mapping starting from a system level use case and ending with a function level use case; and
a machine comprehension system coupled to the dynamically configurable neural network engine and configured to associate a plurality of product development documents with a knowledge base of customer-vendor interactions and to provide input to the neural network engine.

* * * * *